(12) United States Patent
Chestnut et al.

(10) Patent No.: US 6,561,172 B1
(45) Date of Patent: May 13, 2003

(54) NITROUS OXIDE PLATE SYSTEM FOR ENGINES

(75) Inventors: Daniel W. Chestnut, Fullerton, CA (US); Eric M. Lowe, Covina, CA (US)

(73) Assignee: Edelbrock Corporation, Torrance, CA (US)

( * ) Notice: Subject to any disclaimer, the term of this patent is extended or adjusted under 35 U.S.C. 154(b) by 0 days.

(21) Appl. No.: 10/039,839

(22) Filed: Oct. 26, 2001

(51) Int. Cl.[7] .................................................. F02B 23/00
(52) U.S. Cl. ....................................... 123/585; 123/590
(58) Field of Search ................................ 123/585, 590

(56) References Cited

U.S. PATENT DOCUMENTS 5,839,418 A   11/1998   Grant .......................... 123/585

Primary Examiner—Noah P. Kamen
(74) Attorney, Agent, or Firm—Ronald M. Goldman

(57) ABSTRACT

A nitrous plate (1) includes four end-fed nitrous oxide spray conduits (2, 4, 6 & 8) positioned coplanar in the plate passage (21), supported at one end by respective walls (17, 18, 92 & 20) of the plate with closed distal conduit ends positioned near the center (22) of the plate passage. Two conduits (2, 6) are coaxially aligned with their closed ends in confronting relationship across the central axis of the plate passage. The remaining conduits (4, 8) are coaxially aligned with closed ends in confronting relationship across the central axis to the passage and are oriented perpendicular to the other conduits. Four fuel spray conduits are included in a separate plane and are organized in the foregoing way. The distal ends of the spray conduits are mechanically linked together by a junction block (10).

12 Claims, 2 Drawing Sheets

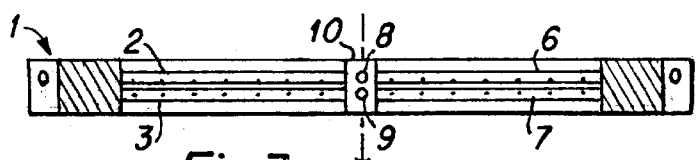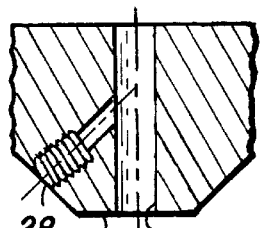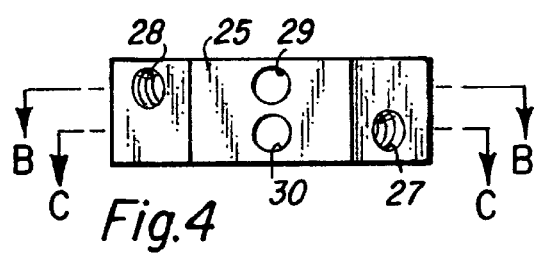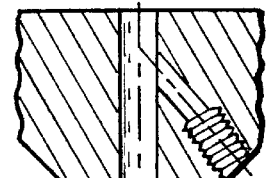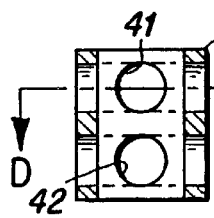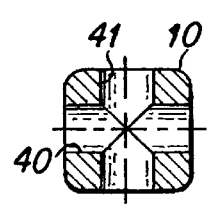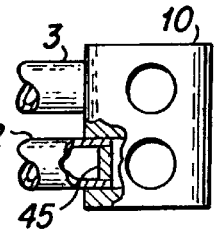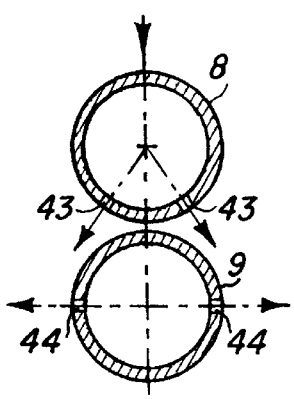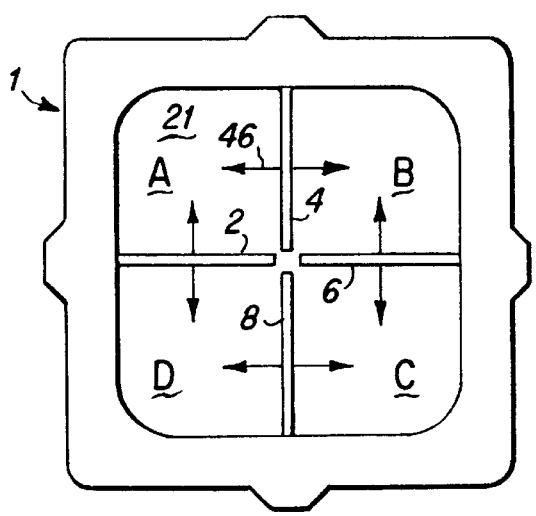

NITROUS OXIDE PLATE SYSTEM FOR ENGINES

FIELD OF THE INVENTION

This invention relates to nitrous oxide fuel systems for internal combustion engines, and, more particularly, to a nitrous module construction that improves the distribution of the nitrous oxide/fuel mixture amongst the cylinders of the internal combustion engine.

BACKGROUND OF THE INVENTION

In a conventionally fueled internal combustion engine, vaporized fuel, typically either gasoline or alcohol, introduced through a carburetor mixes with outside air drawn into the engine manifold to form a combustible mix. That combustible mix, as example, is drawn through an intake runner of the manifold and into a cylinder of the engine where the combustible mix is ignited, typically, by the spark produced by a spark plug in the engine ignition system. The resultant explosion in the engine cylinder drives the piston, producing the mechanical force that is ultimately transferred to the wheels of the automobile. The foregoing combustion process repeats for each cylinder in the engine. The proportion of oxygen in a given volume of air relative to the other components of the air, such as nitrogen, is relatively fixed. Typically, through proper carbureation, the ratio of oxygen and fuel in the mixture is set to the optimal ratio that is known to achieve the most efficient explosion.

To enhance performance of internal combustion engines in automotive racing application beyond that possible with conventional fuel systems, drag racing enthusiasts learned to inject nitrous oxide ("$N_2O$") into the cylinders along with the combustible mix introduced by the carburetor and to accompany the nitrous injection with an injection of additional fuel, the gasoline or alcohol used as fuel in the carburetor. Air typically contains about 15% oxygen (by volume) while Nitrous Oxide contains 33% oxygen. When heated to elevated temperatures available within the engine, the nitrous oxide decomposes into molecules of nitrogen and oxygen. In that way oxygen is released and added to that oxygen in the air introduced through the carburetor, enriching the combustible mix in the cylinders. To a limit, the greater the percentage of oxygen in the combustible mixture, the stronger is the explosion that results when the mixture is ignited. Therefore, when nitrous oxide is injected into the combustion chamber of the cylinder, the power of the explosion is greatly increased, thus producing increased horsepower from the engine. The additional fuel accompanying the nitrous oxide prevents the combustible mixture from becoming too lean as could cause overheating and damage to the engine. As an advantage, a nitrous oxide system may be used without requiring expensive modification of the internal combustion engine Two principal techniques for introducing the nitrous oxide are currently in use, one by injection of the nitrous directly into the intake runners. The other by injecting the nitrous into the plenum of the intake manifold.

The first, often referred to as a nitrous nozzle system, employs multiple nozzles, each containing a pair of outlets for individually expressing both nitrous oxide and fuel. Each nozzle is placed directly into a respective one of the intake runners. When the system is activated during engine operation, nitrous oxide and fuel are introduced into a respective runner by the nozzle associated with that runner. The nitrous is under high pressure and, on expression from the nozzle, changes from a liquid state to what is said to be a predominantly gaseous state. That essentially vaporized nitrous oxide impacts the expressed fuel at high velocity. The force of that impact atomizes the fuel and the nitrous oxide mixes therewith. That nitrous and fuel mixture merges into the air/fuel mixture being drawn through the carburetor into the intake runner through which the combustible mixture is drawn into respective engine cylinders. The nozzle system is considered the optimal technique for delivering nitrous oxide to the engine. A leading nozzle design, as example, is presented in U.S. Pat. No. 5,699,766, granted Dec. 23, 1997 to Wood et al., entitled Nozzle for Mixing Oxidizer With Fuel.

The second technique is referred to as a nitrous module or, as variously termed, nitrous plate system. The module or plate employs a generally rectangular or square metal plate that contains a central opening or passage sized to match the plenum of the intake manifold and at least one pair of spray conduits that extend across that central passage to respectively introduce the nitrous oxide and fuel into the plenum of the intake manifold. That plate is sandwiched between the carburetor and the intake manifold of the engine. Nitrous oxide and fuel are respectively applied through respective passages in the plate and into the ends of the respective spray conduits, where the respective fluids are expressed through the jets or small holes in the side of the conduits into the central opening to merge with the air/fuel mixture being drawn through the carburetor. A leading design for a nitrous plate system is described in U.S. Pat. No. 5,839,418 to Grant entitled Dual Stage Nitrous Oxide and Fuel Injection Plate, granted Nov. 24, 1998 (the "'418 Grant patent").

In the design described in the '418 Grant patent a module, the plate member contains the central opening that serves as a passageway for the air and fuel stream to flow from the carburetor into the intake manifold. The plate also supports two pairs of adjacent straight parallel spray conduits with one pair of conduits overlying and criss-crossing the other pair of conduits, referred to as a double stage system. One spray conduit in each pair, located downstream, contains outlets, referred to as nozzles, for spraying fuel. The other conduit of the pair, located upstream, contains outlets for spraying nitrous oxide in a generally downstream direction. One pair of nitrous and fuel conduits extend across the passage with the ends anchored in opposed sidewalls on the plate that border the passageway. The other pair of nitrous oxide and fuel conduits are oriented perpendicular to the first pair and are similarly anchored in another set of opposed sidewalls of the plate. Fuel and nitrous oxide are fed into respective internal conduits in the plate and connect to an end of the respective fuel and nitrous oxide spray conduits in each of the two pairs of conduits.

Historically, the nozzle system attained superior results over predecessor techniques, including over the nitrous plate system. As a result, the nozzle system achieved wide acceptance among racing enthusiasts. An unfortunate problem is faced by that system, however, one that is political in nature. The nozzle system is not permitted by the racing associations for use in several classes of drag racing. That prohibition limits many drag racers to use of the plate system.

However, the plate system is not without a drawback. Distribution, that is, the even or balanced distribution of the added nitrous oxide and fuel amongst all of the engine cylinders is a key factor in the use of the plate system. The plates are known to have problems with distribution; they do not always evenly distribute the nitrous oxide and fuel amongst the many intake runners of the manifold. As a consequence, some cylinders of the engine receive more or less of the combustible mix than other cylinders; and that imbalance not only detracts from engine performance, but could potentially harm the engine internally. Existing nitrous plates currently being marketed are found to have poor or inconsistent distribution leading to inconsistent quantities of nitrous oxide and fuel reaching the engine cylinders, something that drag racers tend to steer away from. As an advantage, the present invention avoids that problem.

The spray conduits of the prior design each span the length of the central passage through the plate. When the respective solenoid valves in the automobile open to permit the nitrous and fuel to enter the respective spray conduits, the respective liquids flow into and to the end of the conduits. Although the nitrous is under a very high pressure Some very small but finite interval of time is required for the initial flow of the nitrous oxide to reach the end of the conduit so that the respective spray conduits fully function to express nitrous oxide evenly from all outlets in the conduit. Accordingly, some lag will exist in developing the horsepower available from the engine through use of the plate system. The means for reducing that lag in a plate system has not been known. As an advantage, the present invention reduces that lag.

The consequences of the initial flow of nitrous oxide into the spray conduit has also been thought to be a possible source of some of the distribution problem experienced by users of the prior nitrous plate system. It has been asserted that nitrous oxide under high pressure is capable of vaporizing from the fluid state in the short time that it takes for the initial flow of nitrous oxide to span the distance from the center of the plate passage way over to the end of the conduit at the distant side wall of the passage way. Since the size and shape of the passage way is fixed to the size of the carburetor throat and the intake manifold passage, the reduction of that distance did not appear possible. As a further advantage, the present invention reduces the distance the fluids must travel to reach the end of the respective conduits.

Therefore, a principal object of the invention is to improve the distribution of nitrous oxide and fuel in nitrous plate systems and improve the horsepower developed by an engine that employs a nitrous plate system.

An additional object of the invention is to minimize or entirely prevent premature vaporization of any part of the nitrous oxide inside the nitrous oxide spray conduit of the nitrous plate.

A related object of the invention is to reduce start up lag in a nitrous plate system and, thereby, enhance acceleration of the engine.

And, it is an additional object of the invention to increase the nitrous oxide/fuel handling capability of a plate system, permitting the plate to deliver greater volumes of nitrous oxide and fuel to the intake manifold so that greater horsepower may developed by the engine.

SUMMARY OF THE INVENTION

Briefly described, the present invention comprises a single stage nitrous oxide and fuel supply module, referred to in the industry as a plate, that is placed between the carburetor and the intake manifold of an internal combustion engine. The plate has a transversely extending passage or hole, referred to as an open core, which permits the fuel and air from the carburetor to pass through the plate and enter the plenum of the intake manifold of the engine (and pass therefrom ultimately into the combustion chamber of the respective engine pistons). The plate also contains eight spray conduits to respectively carry nitrous and fuel into the open core and distribute the respective contents into the plenum of the intake manifold.

The plate includes four nitrous oxide passages and four nitrous oxide inlets. Each of those inlets is associated with a respective one of the nitrous oxide passages for inputting nitrous oxide therein and four nitrous oxide spray conduits, positioned in the central passage in coplanar relationship. An end of each nitrous oxide conduit is supported from a plate wall and is open to admit nitrous oxide from a respective one of the nitrous oxide passages in the plate. The other end of each conduit, located near the center of the central passage is closed. Two of the nitrous oxide spray conduits are oriented along a first axis across the central passage with the distal ends thereof in a confronting relationship. The remaining two spray nitrous oxide spray conduits are oriented along a second axis across the passage with the distal ends thereof also in a confronting relationship, and the latter common axis across the passageway is perpendicular to the other common axis. As an additional aspect to the invention the distal ends of the spray conduits are mechanically linked together.

Four fuel spray conduits are included in the plate positioned coplanar in a separate plane underlying the former plane for the nitrous oxide spray conduits. A like arrangement to that of the nitrous oxide conduits is included for the plate and for the fuel spray conduits. The separate conduits, are individually supplied with respective nitrous oxide or fuel, functioning as separate entities.

As an advantage, the present invention employs twice the number of nitrous oxide and fuel inlets (e.g. fittings) than in conventional plates, and is able to supply twice the nitrous and fuel than any other plate of this type being marketed.

As a further advantage, the present invention ensures that an equal amount of nitrous and fuel is distributed to each quarter of the intake manifold, leading to a much safer and consistent increase in horsepower.

The foregoing and additional objects and advantages of the invention, together with the structure characteristic thereof, which were only briefly summarized in the foregoing passages, will become more apparent to those skilled in the art upon reading the detailed description of a preferred embodiment of the invention, which follows in this specification, taken together with the illustrations thereof presented in the accompanying drawings.

BRIEF DESCRIPTION OF THE DRAWINGS

In the drawings:

FIG. 3 is a side section view of the embodiment of FIG. 1 taken along the lines A—A in the top view of FIG. 2;

FIG. 4 is a front view of a protruding portion of the outer wall of the plate member used in the embodiment of FIGS. 1 and 2;

FIG. 5A is a partial section view of the protruding portion at a certain height taken along the lines B—B in the top view of FIG. 4 and FIG. 5B is another section at a lower height as taken along the lines C—C in FIG. 4;

FIG. 6A is a side view of the junction component used in the embodiment of FIGS. 1 and 2 and FIG. 6B is a section view of that junction taken along the section line D—D in FIG. 6A;

FIG. 7 is a partial cut away of the juncture of the junction block and two of the conduits used in the embodiment of FIGS. 1 and 2 that shows the closed end of the conduit; and FIG. 8 shows a pair of the conduit members used in the embodiment of FIG. 1 in an enlarged section view; and FIG. 9 is a pictorial used in connection with a discussion of operation of the invention.

DETAILED DESCRIPTION OF THE PREFERRED EMBODIMENT

Figure 1:
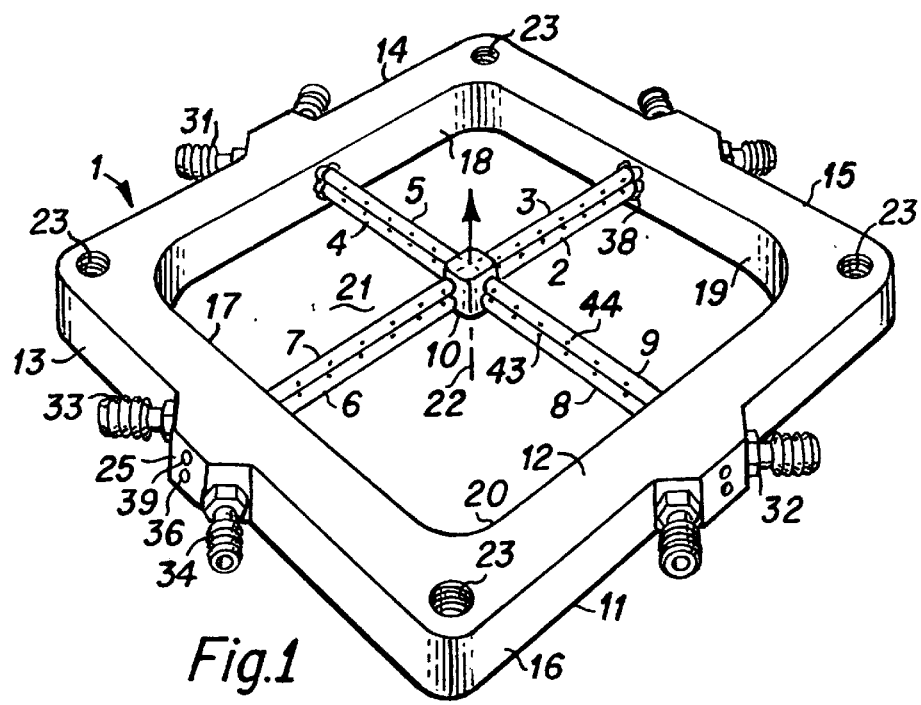
FIG. 1 illustrates and embodiment of the invention in a bottom perspective view.
Figure 2:
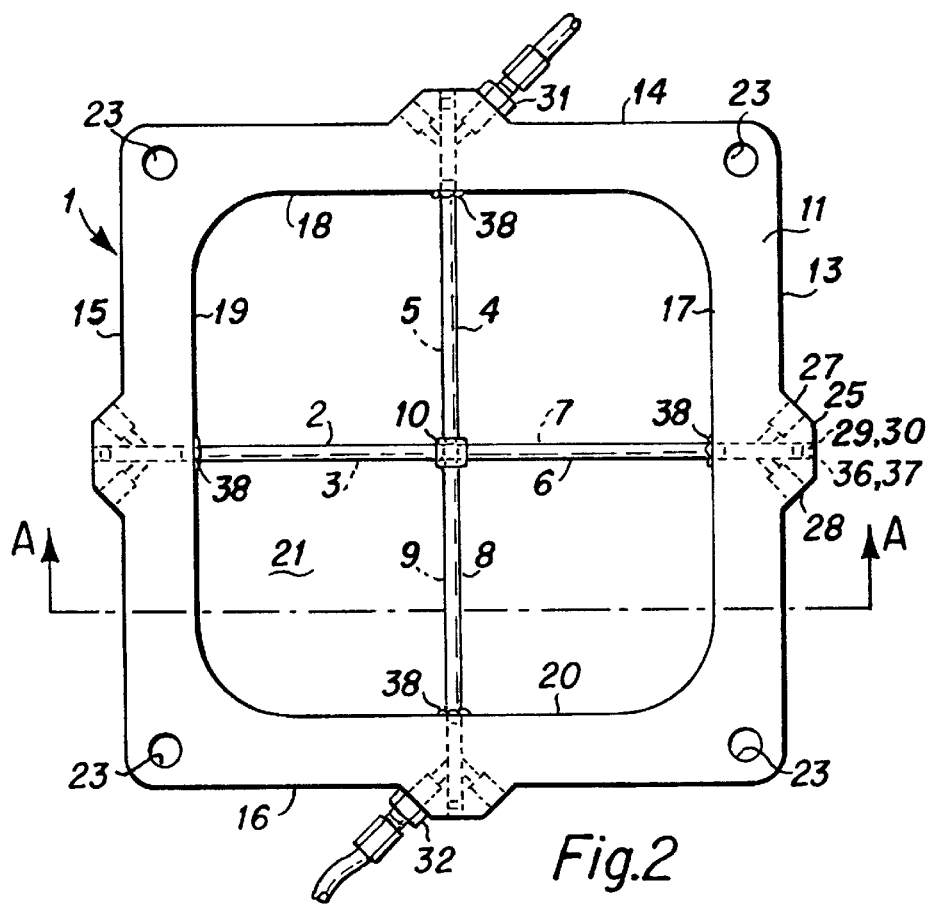
FIG. 2 is a top view of the foregoing embodiment of the invention.

Referring now to the drawings, in which like numerals indicate like parts throughout the several views, FIG. 1 illustrates a preferred embodiment of the nitrous oxide module or plate of the invention as viewed in a bottom perspective; FIG. 2 shows that embodiment as viewed from the top; and FIG. 3 is of that embodiment in side section view taken along the lines A—A in FIG. 2. As installed for use, the plate is placed in between the carburetor and the intake manifold of a high performance internal combustion engine, not illustrated. The module or plate includes a metal body 1, which is also referred to in the industry as a plate, eight conduits 2, 3, 4, 5, 6, 7, 8 and 9, referred to as spray conduits, best viewed in the bottom perspective of FIG. 1, and a junction or junction block 10 that is attached to an end of the foregoing conduits.

Plate 1 is of a square or rectangular shape "picture-frame-like" structure sized to match the shape of the carburetor adapter portion of the intake manifold. The plate contains a flat upper 11 and lower 12 surfaces to respectively mate to the carburetor and to the carburetor adapter of the intake manifold, outer side walls 13, 14, 15 and 16, and inner side walls 17, 18, 19 and 20.

Inner side walls 17, 18, 19 and 20 define and border the central opening or passage 21, sometimes referred to as a core, centrally located in plate 1. That passage extends through the top and bottom surface and along the axis 22 of the plate. In shape and area, passage 21 matches the area of the inlet of the intake manifold, for one, so as to permit the passage of the stream of air and fuel from the carburetor, not illustrated, to flow from the top of the plate, through the plate in the direction of axis 22 and into the intake manifold, not illustrated. The plate is secured between the carburetor and the intake manifold in a sandwich like configuration using carburetor studs, not illustrated, that extend from the carburetor through the four bolt holes 14 at the corners of the plate.

Each outer wall of plate 1 includes a small integrally formed centrally located portion that protrudes radially outwardly of the remainder of the respective outer wall, such as protruding portion 25 in outer wall 13, only one of which is numbered. Those protruding portions slightly modify the general rectangular or square shape of the plate. In this embodiment, as best viewed in FIG. 2, the protruding portion are of a right trapezoid in shape, with a first short flat wall bridging two short flat side walls formed at forty-five degree angles, positive and negative, one at each end of the first wall, and extending back to the remaining wall portion.

Each of the slanted walls in protruding portion 25 includes the opening for respective internal passages 27 and 28 within the metal of the plate, represented in FIG. 2 by phantom lines, and two additional passages 29 and 30, the latter of which is not visible in FIG. 2. Those passages are better viewed in the partial front view of protruding portion 25 illustrated in FIG. 4 to which reference may be made. Passages 27 and 28, sometimes referred to as fitting passages, are provided for the fittings (or the familiar jet holders) to couple, respectively, the fuel supply line and the nitrous oxide supply line carried by the automobile equipped with the foregoing nitrous module. The front end of the respective passages are sized and threaded to receive those fittings. As example, two such fittings 31 and 32 are illustrated in FIG. 2, which are attached to other protruding portions of other outer walls in the plate, and, fittings 33 and 34 are shown installed in passages 27 and 28 in the bottom perspective of FIG. 1. It is understood that the fittings do not constitute a part of the invention, but are illustrated to assist in the understanding of the invention.

Continuing with FIG. 4, the front wall of the protruding portion 25 contains the entrance of two additional vertically aligned internal passages 29 and 30 that extend through the inner side wall. Passage 29 is also illustrated in phantom lines in FIG. 2, but passage 30, which underlies passage 29, is not visible in that view. Passages 29 and 30 are slightly larger in diameter than the diameter of the respective nitrous and fuel spray conduits and the axes of those two passages are vertically aligned. All the internal passages may be formed by drilling into the plate. As later described, the fuel spray and nitrous spray conduits are inserted through respective passages 30 and 29 into position in the plate, and the entrances to the respective passages are then plugged.

Fitting passage 28 extends at a forty-five degree angle relative to passage 29 and connects to the latter passage as is illustrated in FIG. 5A, which is a section of the protruding portion 25 taken along the line B—B in FIG. 4. Likewise, fitting passage 27 extends at a forty-five degree angle relative to passage 30, and connects to the latter passage as is illustrated in FIG. 5B, which is a section of the protruding portion 25 taken along the line C—C in FIG. 4.

Returning to FIG. 2, passage 29 supports a small portion of the length of nitrous spray conduit 6 to hold the conduit in a cantilever-like manner. The conduit is of a length that extends from the proximal end inside passage 29 approximately to the center of opening 21 where junction 10 is held suspended by or mechanically links to the eight spray conduits. To affix conduit 6 to inner wall 17 as well as to ensure against leakage of any liquid, epoxy bonding material 38 is applied between the conduit and inner wall 17. Further, plugs 36 and 37 respectively seal the entrance to passages 29 and 30, which prevents leakage of nitrous oxide and fuel from that end of the passage during operation of the module.

Each of the remaining three protruding portions in the outer walls of plate 1 have the same structure described in the preceding paragraphs in respect of portion 25 and that description is not repeated. Additionally, the passages in the other protruding portions in the other outer walls have the same relationship to the associated pair of spray conduits, nitrous and fuel conduits, which need not be repeated.

Reference is again made to the bottom view of the plate in FIG. 1. Supported at one end by respective inner walls of plate 1, the remaining end, the distal end, of each of the eight conduits, 2 through 9, are attached to and support junction block 10 in the center of the major passage 21. The block is rectangular in shape, small and light in weight. Each side of the block is connected to and holds two of the conduits, one of which expresses nitrous oxide and the other of which expresses fuel, as example, conduits 6 and 7.

Referring to the side section view of FIG. 3, junction block 10 is positioned in the plate member coaxial of the central axis 22 of passageway 21. Referring next to the top view of FIG. 2, as indicated by the phantom lines in the illustration of junction block 10, a short length of the distal end portion of conduits 2, 4, 6 and 8 extends into a passage in the block. The same relationship with junction 10 is also used in the underlying conduits 3, 5, 7 and 9, not visible in this view. The junction mechanically links together the ends of those spray conduits. Conversely, the junction block is centrally supported within central passage 21 of the plate member solely by those eight conduits.

The junction 10 is separately illustrated in FIGS. 6A and 6B to which reference is made. FIG. 6A shows a side of block 10. FIG. 6B is a section of the block taken along lines D—D in FIG. 6A, which extends through the passages in the uppermost part of the block. As shown, two passages 40 and 41 are drilled through the block at right angles to one another, each of which extends through a pair of opposed sides of the block. The passages are of a diameter sufficient to permit insertion of the end of a spray conduit, preferably with a friction fit. Epoxy may also be used between the junction and the conduit to insure that the connection to the block is permanent. Referring back to FIG. 6A, a like set of crossed passages, one of which is passage 42, is located below the foregoing set of passages for use with the lower set of spray conduits in the assembly. The center to center distance between upper and lower passages in junction 30 is the spacing desired between the spray conduits for the nitrous and those for the fuel.

Referring again to the bottom view of FIG. 1, spray conduits 2 through 9 are metal cylinders, hollow bars, pipes, tubes, or, as variously termed, conduits, that contain two sets of longitudinally spaced jets or small holes in the cylindrical side wall to permit expression of multiple streams of fluid. Those small holes are represented in the figure by the spaced black dots, as example hole 43 in conduit 8 and holes 44 in conduit 9, which are representative. A second set of like holes is included in each respective conduit 8 and 9 on a side of the conduits that is not visible in this figure, but are discussed later in connection with FIG. 8.

Each small hole 43 in the nitrous spray conduit is in axial alignment with a corresponding hole 44 in the fuel spray conduit on the side of the conduits visible in the bottom view of FIG. 2. The same relationship is included for the respective sets of small holes on the side of those two conduits that is not visible in the figure. For convenience, all conduits may be of the same diameter and all may be of the same length. The circumferential or angular position of the small holes relative to the axis of the respective conduits for the fuel differs from the arrangement for those used for the nitrous oxide is described in connection with FIG. 8. The conduits are formed of a strong, stiff, relatively rigid, straight thin-walled metal tube, suitably brass, that is drilled to form the longitudinally spaced small holes that forms the conduit into a sprayer or, as used herein, spray conduit.

Each conduit contains an open end, the proximal end, which is anchored in the associated inner wall of plate 1, and a second or distal end, which is closed. The distal end of the conduits is sealed at the ends with a plug or solder, as example, plug 45 as illustrated in the partial section view of conduit 2 in FIG. 7 to which reference may be made. Those sealed ends seat in junction block 10 to support the conduits and to form a common junction for the conduits to meet. As represented in the figure a short length of the conduit fits inside the passage in junction block 10 for better support.

Making reference again to FIG. 1, spray conduits 2, 4, 6 and 8 for the nitrous oxide are essentially oriented so that the respective axes of all of those conduits are located in a single plane; that is, the respective axes are coplanar. In that sense, those conduits may therefore also be referred to as being coplanar. Likewise, spray conduits 3, 5, 7 and 9 for the fuel are oriented so that the respective axes of those conduits are positioned in a second plane, spaced vertically below the former plane (e.g. "below" is in the direction of the arrow in this bottom view). That is, the second plane is spaced along the central axis 22 of plate 1 from the first. Hence, the fuel conduits may also be referred to as being coplanar.

The axis of nitrous spray conduits 2 and 6 are aligned, extending in a straight line along a common axis. The axes of nitrous spray conduits 4 and 8 are also aligned, extending in a line along another common axis, perpendicular to the other. And the two foregoing common axis extend at right angles to one another. Likewise, the axes of fuel spray conduits 3 and 7 are aligned along a common axis, the axes of fuel spray conduits 5 and 9 are aligned along another common axis, and the two foregoing common axes extend perpendicular to one another. Both sets of nitrous oxide and fuel spray conduits are angularly aligned about central axis 22. The plate and those conduits are also seen to be symmetrical in structure about either the horizontal or vertical axis in the top view of the module in FIG. 2.

Further, the nitrous and fuel spray conduits may be considered to be organized in pairs of conduits. One conduit, the uppermost in a given pair, more close to the upper surface of plate 1, is for expressing nitrous oxide. The other conduit in the pair, the lowermost, located closest to the bottom surface of the plate, is for expressing fuel. Spray conduits 2 and 3 form such a pair, spray conduits 4 and 5 form a second pair, 6 and 7, a third pair, and spray conduits 8 and 9, a fourth pair. As shown in the side view of FIG. 3, the nitrous and fuel spray conduits within each pair are spaced from one another a short distance and are oriented in parallel.

Reference is made to FIG. 8, which is an enlarged view of the partial section of spray conduits 8 and 9 taken from the side section view of FIG. 3. Nitrous spray conduit 8 is located near the upper side of plate 1. As earlier described, the axis of that conduit is in the same plane with and is parallel to axis of fuel spray conduit 9, located near the bottom side of plate 1. The set of side holes 44 on the left of conduit 9 are angularly spaced from the set of side holes on the right by one-hundred and eighty degrees about the axis of the conduit. Those holes are located along a diameter of the cylindrical conduit. Essentially the spray holes in both conduits are arranged symetrically relative to a vertical plane in the figure that extends through the axes of both conduits in the pair. Conduit 9 is angularly aligned in plate 1 so that the axes of those holes face and are essentially perpendicular to the respective one of the inner side walls, 17, 18, 19 or 20 of plate 1 or, in other words, are perpendicular to central axis 22 of plate 1.

The corresponding two sets of side holes 43 in nitrous spray conduit 8 are angularly spaced from the vertical in the figure by about thirty degrees. That conduit is angularly oriented in plate 1 so that the two sets of holes 43, as example, are symmetrically positioned relative to the corresponding holes in conduit 9 and face in a downwardly direction toward the bottom of central passage 21 in plate 1. That bottom is indicated by the vertical arrow. It is noted that the arrow also indicates the direction is the direction taken by the fuel and air mixture, the airstream, that flows from the carburetor to the intake manifold of the engine, with the plate installed on the engine during operation. Thus, nitrous oxide expressed from the side wall openings in spray conduit 8 under high pressure is directed into the mist of fuel sprayed from the holes in spray conduit 9, to carry that fuel into the intake manifold.

Nitrous oxide spray conduit holes 43 are aimed to spray the nitrous downward into the intake manifold and over the fuel conduit holes 44. The fuel conduit holes 44 are aimed outwardly, towards the inner walls of the plate so the fuel is expressed as jets of liquid into the high velocity stream of nitrous oxide, thus breaking the fuel into smaller particles and aiding in proper fuel atomization. The mix of nitrous oxide and atomized fuel are then distributed into the various runners of the intake manifold.

Given the components drilled and tapped and cut to length in the relationship described, the module is assembled by partially inserting at least two conduits, such as conduits 6 and 7, through the openings in the protruding portion, such as 25 in FIG. 2, through openings 29 and 30 (FIG. 4), sometimes referred to as conduit insertion passages, and inserting the distal ends of those conduits in the corresponding holes in a face of junction 10, such as 41 and 42 (FIG. 6A). The pair of conduits for the opposite face of that junction are then inserted through the corresponding holes through the opposite face of the plate, such as conduits 2 and 3, and the distal ends of those conduits are inserted in the opposed face of the junction. The same procedure is followed for the two remaining pairs of conduits. Any adjustments are made to ensure that the jets or holes in the conduits are properly angularly aligned and the junction is centered at the axis of the central passage in the plate, the epoxy is applied at the locations earlier indicated to make the relationship permanent.

The plugs are then installed in the conduit insertion passages in the protruding portions 25 of the outer walls of the plate to seal the end of those passages. The module is ready for installation in the automobile and the attachment of the nitrous and fuel fittings in the automobile to the eight individual inlets of plate 1. Because of the greater number of parts used in the module as compared to the prior plate modules, the module is more time consuming to fabricate. However, the greater effort is justified by the greater return in performance.

As in stalled for operation with an internal combustion engine, appropriate supply lines controlled by solenoid valves are connected to each of the four nitrous oxide and fuel inlets, 28 and 27 in the plate. When those valves are operated and open the nitrous and fuel flow through the respective inlets and internal passages, 28 and 29 and 27 and 30, provided in the plate, to the open ends of each of the four nitrous spray conduits and the four fuel spray conduits. The four nitrous spray conduits, located on the plate above the four fuel spray conduits, express nitrous oxide into the central passage of the plate and direct the nitrous oxide at a downward angle toward the intake manifold. The four fuel spray conduits express fuel into the central passage of the plate. The fuel is directed outwardly and is forced downward into the intake manifold by the nitrous oxide, released from the overlying conduit at a very high rate of pressure, generally about 900–950 psig. The nitrous oxide impacts the fuel at a very high rate of speed due to the extreme pressure it is under thereby breaking the liquid fuel into very small particles, an action referred to as fuel atomization, producing a fine mist of fuel, and that mist is mixed in with the nitrous oxide gas.

The foregoing emissions are evenly distributed about the four sectors of the intake manifold. Referring to the pictorial of FIG. 9, the axes of conduits 2,4,6 and 8 divide the central passage 21 of the plate into four sectors labeled A, B, C and D. Typically, in an eight cylinder engine, the entrances to the eight intake runners of the manifold lie under the passage, evenly spaced between those sectors, with two runner entries to a sector. The outward spray of nitrous and fuel from the four pairs of spray conduits is illustrated by the arrows 46, only two of which are labeled. Pictorially, the foregoing appears similar to the prior double-stage plate systems, except there is no overlap or criss crossing of spray nozzles at different levels.

The foregoing invention achieves results superior to the prior plate system, estimated at three to five percent greater horsepower, which is a significant advantage in automotive racing. Although the exact theory is not fully understood, one theory holds that the distribution is better because in the present invention all emissions of nitrous oxide occur in a single plane, whereas in the prior art design, those emission occur at two different vertical levels in the plate. As a result, some of the nitrous oxide emitted from the higher level impinges not only on the associated fuel emissions, but on portions of the nitrous oxide emitted at the lower level, producing a disturbance in the flow that may likely cause misdistribution of the nitrous/fuel in the various runners.

A second theory for the enhanced result is based on the prior knowledge that an engine is able to develop greater horsepower if the nitrous oxide is introduced into the manifold as a liquid instead of a gas. When introduced as a liquid, and then vaporizing, greater volumes of oxygen are produced that enhance combustion. In the plate system, the nitrous oxide expressed from the holes in the spray conduit does not immediately change to the gaseous state at one time, and some portion persists as a fluid. Under this theory, the nitrous is introduced to the manifold both as a gas and in liquid form. If proportionately more liquid nitrous oxide is expressed into the manifold, then the better the combustion. In the prior double stage system, because the nitrous conduits are located at different levels, the nitrous oxide expressed from the conduit at the higher level takes more time to reach the manifold, and, hence, has more time to vaporize before entering the manifold, and, hence, introduces proportionately more nitrous as a gas than a liquid than the other nitrous spray conduit. Also, the prior art plate contains greater spray conduit area, allowing for the nitrous oxide fluid to expand to a gas inside the conduit and is not desirable. With the present invention, a greater proportion of nitrous oxide may be reaching the manifold in liquid form, producing better combustion.

As one appreciates, each spray conduit in the foregoing embodiment is shorter than the spray conduits used in the design of the '418 Grant patent. When the respective solenoid valves open to permit the nitrous and fuel to enter the respective spray conduits of the prior design, the respective liquids flow into those spray conduits. The fluid has a propagation velocity, and takes some small interval of time to reach the distal end of the spray conduit so that the respective spray conduits fully function to express nitrous and fuel evenly from all of the small holes in the respective conduit. Since the length of the spray nozzle in the present invention is about one-half the length of the spray nozzle, the spray nozzle of the present invention is fully function in about one-half the time by comparison. Although that savings may be measured in milliseconds, the savings is a benefit. One must bear in mind that shaving a fraction of a second from the time required to race the vehicle across a quarter-mile racetrack, though small in the absolute sense, is very significant; and the racing enthusiast spends considerable time, effort and money to achieve such improvements.

It is also thought that due to the length of the nitrous spray nozzle of the prior design, that as the liquid is flowing into the conduit some of the liquid at the head of the changes to the gaseous state (e.g. vaporizes) inside the conduit. In other words, that the speed of vaporization is greater than the speed at which the liquid flow is able to reach the end of the conduit, even when propelled by a high pressure of 900–950 psig. Thus, nitrous oxide is being expressed from some of the jets in the conduit as a liquid, and is vaporizing at the outside of the jet, while in other jets at the far end of the conduit, the pressure of internal vaporization is forcing the expression of the nitrous oxide gas. There is a certain unevenness in that result, and that unevenness could produce uneven distribution amongst the four sectors of the intake manifold. It is believed that the shorter spray nozzles characteristic of the present invention do not encounter that unevenness, and, hence, do not encounter the foregoing problem.

Another advantage of the invention is that the plate contains four inlets for each of the nitrous oxide and fuel as compared to the two inlets provided in the prior art design. With four inlets a greater volume of both nitrous oxide and fuel may be supplied to the engine than the prior design. With greater volume, greater horsepower may be obtained from the engine.

In FIG. 1, to which reference is again made, plate 1 appears relatively thin. In the prior design, the nitrous and fuel inlets to the plate module were located one over the other. Those inlets were required to be spaced sufficiently far apart to accommodate the space required for the supply line fittings and/or jet holders, which are available in a standard size. The size of that fitting is seen in the perspective of the figure. To meet the foregoing requirement requires that the plate of the prior art design be greater in thickness than the stacked fittings, and results in a relatively thick plate.

As a mechanical feature, the protruding portions of the foregoing embodiment of the invention, such as protruding portion 25, do not require the fittings to be attached one over the other. Instead, the respective nitrous and fuel are placed in separate slanted walls on the protruding portion as shown in the figure. Thus, the thickness of plate 1 only needs to accommodate the space required for a single fitting, effectively reducing the thickness required in plate 1 by half. This is much thinner. In use, the plate is installed underneath the carburetor of the automobile and vertically raises the carburetor a smaller amount than before. That shorter rise permits greater clearance between the top of the carburetor and the automobile hood or permits use of the hood in situations where the prior plate system required removal or modification of that hood.

As those skilled in the art recognize the protruding outer wall portions 25 of plate 1 are unique and provide a key feature of the invention, distinctive from other nitrous plates on the market. The four protruding wall portions allow the use of separate inlet ports for each of the eight nitrous and fuel conduits. Other nitrous plates, such as that shown in the '418 Grant patent patent, only permit a single inlet port for a spray conduit, the latter of which extends the length of the plate opening 13.

With all of the nitrous spray nozzles being located essentially in a single plane, better distribution of the combustible mix is achieved. In the prior design, one set of spray conduits are located on one side of the plate member and another set of those spray conduits is located on the other side of the plate member in a criss-cross relationship with the former spray conduits, placing the nitrous spray conduits in separate spaced planes.

In a practical embodiment, plate 1 is fabricated of aluminum, which, after drilling is black anodized. The same material is used for junction block 10. And the conduits are formed of brass. The plugs used in the passages through which the conduits were inserted during assembly of the module, such as plug 36, may be covered with epoxy for better appearance.

In the foregoing embodiment, the junction block 10 contained two passages that extended completely through the block at right angles to one another and the closed distal ends of the spray conduits were installed in those block passages. Because the distal ends of the conduits were closed, no fluid could leak from the end of any spray conduit and flow through a block passage to enter another spray conduit, or leak out the block. As one appreciates, an alternative embodiment would employ the material of the junction block to serve to close the distal end of the conduits.

In such an alternative embodiment, holes of short depth would be drilled into each face of the junction block, sufficient to receive the same small portion of the length of the respective conduits as before, including the distal end of the conduit. Those block passages would not be drilled completely through the block as in the preceding embodiment. The rear end of the short block passage is a solid wall, which can cap or plug the distal end of the respective conduit. The distal ends of the conduit may be coated with epoxy prior to insertion in the short passage sealing the distal end shut against the rear wall of the block passage. Once the distal ends are installed in that alternative junction block, epoxy may be applied at the outside surface of the block about the cylindrical outer wall of the conduits as an additional seal. Although the alternative embodiment offers another technique for closing or plugging the distal end of the conduit and comes within the scope of the present invention, that alternative embodiment is less preferred as it has more manufacturing complexity than the prior embodiment.

Those skilled in the art appreciate from an understanding of the foregoing description that the spray conduits are strong and rigid, have an end supported within a passage in a metal wall of the plate, and are affixed to that wall with epoxy. Hence, at first blush, one might be inclined to omit junction 10 from the foregoing combination. Doing so, however, leaves the individual spray conduits mounted to the respective wall in of the plate in a cantilever like arrangement, operating in the same manner as before. Such a modification, however, does not appear practical or feasible.

First, one finds in practice that shock and/or vibration often occurs in the operation of the engine. Despite the strength and rigidity of the conduit, the free ends of the conduits could vibrate (or oscillate) under the foregoing circumstances, and some conduits could oscillate out-of-phase with the others as could adversely affect distribution of nitrous oxide and fuel, and result in inconsistent engine performance.

Second, and more importantly, the nitrous oxide is fed into the nitrous spray conduits under high pressure, approximately 900–950 psig, and, when released through the multiple outlets of the conduit into the more rarified atmosphere of the intake manifold, changes to the gaseous state, forcefully expanding in volume to create powerful streams directed toward the intake manifold. Since a force in one direction creates an equal and opposite force in reaction, the release of the nitrous through the holes in the conduit would create a torque on the nitrous spray conduits.

Such a torque (or the repeated application and withdrawal of such a torque) could weaken or break the epoxy bond that secures the conduit to the inner wall of the plate. The high pressure exerted by the liquid nitrous inside the conduit would produce an axial force on the closed end of the conduit that would shoot or blow the conduit from the plate. It is also possible for the axial force produced in the conduit by the liquid nitrous oxide to alone break the epoxy bond and expel the conduit. Should a spray conduit break off or be expelled from the anchor in the plate, the broken or detached conduit would drop into the intake manifold and cause damage to the engine, a highly undesirable event.

It is believed that the foregoing description of the preferred embodiments of the invention is sufficient in detail to enable one skilled in the art to make and use the invention without undue experimentation. However, it is expressly understood that the detail of the elements comprising the embodiment presented for the foregoing purpose is not intended to limit the scope of the invention in any way, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. A nitrous plate for supplying nitrous oxide and fuel to the intake manifold of an internal combustion engine, comprising:
   a plate containing walls defining a central passageway, said plate being sized to fit between a carburetor of said engine and said intake manifold, said central passageway providing a passage there through for an air stream from said carburetor to said intake manifold, and said passage having a central axis;
   said plate including four nitrous oxide passages and four nitrous oxide inlets, each of said inlets being associated with a respective one of said nitrous oxide passages for inputting nitrous oxide to said respective nitrous oxide passages;
   four nitrous oxide spray conduits, said nitrous oxide spray conduits being positioned in said passage way in coplanar relationship;
   each said nitrous oxide spray conduit having a proximal end and a distal end, said proximal end being supported by a wall of said plate and being open to admit nitrous oxide from a respective one of said four passages in said plate, and said distal end being closed;
   a first and second nitrous oxide spray conduit of said four nitrous oxide spray conduits being oriented along a first axis across said passageway with said distal ends thereof in confronting relationship and positioned symmetrically of said central axis of said passageway; and
   A third and fourth nitrous oxide spray conduit of said four nitrous oxide spray conduits being oriented along a second axis across said passageway with said distel ends thereof in confronting relationship and positioned symmetrically of said central axis of said passageway; and
   said second axis across said passageway being oriented perpendicular to said second axis across said passageway.

2. The nitrous plate as defined in claim 1, further comprising: a junction block for mechanically linking together said distal ends of all said nitrous oxide spray conduits.

3. The nitrous plate as defined in claim 1, further comprising:
   wherein said plate further includes four fuel passages and four fuel inlets, each of said inlets being associated with a respective one of said fuel passages for inputting fuel to said respective passages;
   four fuel spray conduits, said fuel spray conduits being positioned in said passage way in coplanar relationship;
   each said fuel spray conduit having a proximal end and a distal end, said proximal end being supported by a wall of said plate and being open to admit fuel from a respective one of said four fuel passages in said plate, and said distal end thereof being closed;
   a first and second fuel spray conduit of said four fuel spray conduits being oriented along a third axis across said passageway with said distal ends thereof in confronting relationship and positioned symmetrically of said central axis of said passageway; and
   a third and fourth fuel spray conduit of said four fuel spray conduits being oriented along a fourth axis across said passageway with said distal ends thereof in confronting relationship and positioned symmetrically of said central axis of said passageway;
   said fourth axis being oriented perpendicular to said third axis; and
   said third axis being spaced at a position along said central axis vertically below the axial position of said first axis along said central axis and in parallel with said first axis.

4. The nitrous plate as defined in claim 3, further comprising: a junction block for mechanically linking together said distal ends of spray conduits.

5. A nitrous oxide module for adding nitrous oxide and fuel to an airstream flowing from a carburetor to the intake manifold of an internal combustion engine, comprising:
   a plate member for placement between a carburetor and an intake manifold, said plate member having one side for seating a carburetor and a opposite side for connection to an intake manifold, said plate member further defining a central passage there through sized and shaped for passing an airstream from said carburetor to said intake manifold, said central passage having a central axis extending parallel to the direction of flow of said airstream;
   first, second, third and fourth pairs of spray conduits, said spray conduits being straight and elongate;
   a first spray conduit of each of said first, second, third and fourth pairs of spray conduits being positioned coplanar;
   a second spray conduit of each of said first, second, third and fourth pairs of straight elongate spray conduits being positioned coplanar;
   each spray conduit of said first, second, third and fourth pairs of spray conduits containing first and second ends and including at least two spaced sets of small longitudinally spaced openings in a side, said first end of each of said spray conduits being anchored to said plate member and being open to admit liquid and said second end of each of said spray conduits being closed;
   said spray conduits of said first pair of spray conduits being mounted in parallel and oriented one behind the other along said central axis of said passage, wherein a first spray conduit of said first pair of spray conduits is positioned upstream and a second spray conduit of said first pair is positioned downstream of the other;
   said spray conduits of said second pair of spray conduits being mounted in parallel and oriented one behind the other along said central axis of said passage wherein a first spray conduit of said first pair of spray conduits is positioned upstream and a second spray conduit of said first pair is positioned downstream relative to one another;
   said spray conduits of said third pair of spray conduits being mounted in parallel and oriented one behind the other along said central axis of said passage wherein a first spray conduit of said first pair of spray conduits is positioned upstream and a second spray conduit of said first pair is positioned downstream relative to one another; said spray conduits of said fourth pair of spray conduits being mounted in parallel and oriented one behind the other along said central axis of said passage wherein a first spray conduit of said first pair of spray conduits is positioned upstream and a second spray conduit of said first pair is positioned downstream relative to one another;

said first pair of spray conduits being oriented in line with said second pair of spray conduits, and with said second ends of each of said spray conduits in said first and second pairs of spray conduits being in spaced relationship and facing one another;

said third pair of spray conduits being oriented in line with said fourth pair of spray conduits, and with said second ends of each of said spray conduits in said third and fourth pairs of spray conduits being in spaced relationship and facing one another;

said first and second pairs of spray conduits being oriented at a right angle with respect to said third and fourth pairs of spray conduits; and said plate member further including first supply means for supplying liquid nitrous oxide to the open end of said first spray conduit in each of said first, second, third and fourth pairs of spray conduits and second supply means for supplying liquid fuel to said second spray conduit in each of said pairs of spray conduits.

6. The fuel supply module as defined in claim 5, wherein said first spray conduits of said first through fourth pairs of spray conduits are the same in length and diameter; and wherein said second spray conduits of said first through fourth pairs of spray conduits are the same in length and diameter.

7. The fuel supply module as defined in claim 5, further comprising: a junction for mechanically coupling each of said second ends of said spray conduits, said junction being positioned centrally in said central passage of said plate member.

8. The fuel supply module as defined in claim 7, wherein said junction comprises a rectangular shaped metal block having two pairs of opposed rectangular surfaces, each surface of said metal block including a pair of spaced entry holes for receiving a second end of each of the first and second spray conduits of a pair of spray conduits, and wherein the second end of each of said first and second spray conduits in a pair of spray conduits is respectively fitted within said holes.

9. The fuel supply module as defined in claim 5, further comprising: a junction block for mechanically coupling to each of said second ends of said spray nozzles and for closing said second end of each of said spray conduits, said junction block being positioned centrally in said central passage of said plate member and being supported solely by said spray conduits.

10. The fuel supply module as defined in claim 5, wherein said first supply means comprises:

first, second, third and fourth nitrous oxide inlets for receiving liquid nitrous oxide from an external source, a corresponding plurality of internal conduits coupled to respective ones of said inlets and respective ones of said open first ends of said first spray conduits of said first, second, third and fourth pairs of spray conduits, respectively, for communicating liquid nitrous oxide to said respective first spray conduits; and wherein said second supply means comprises:

first, second, third and fourth fuel inlets for liquid fuel, and a corresponding plurality of internal conduits coupled to respective ones of said fuel inlets and respective ones of said open first ends of said second spray conduits of said first, second, third and fourth pairs of spray conduits, respectively, for communicating liquid fuel to said respective second spray conduits.

11. The fuel supply module as defined in claim 10, further comprising:

nitrous oxide supply means for supplying liquid nitrous oxide to said nitrous oxide inlets, whereby said first spray conduit in each of said pairs of spray conduits receives liquid nitrous oxide; and fuel supply means for supplying liquid fuel to said fuel inlets, whereby said second spray conduit in each of said pairs of spray conduits receives liquid fuel.

12. The fuel supply module as defined in claim 11, wherein each of said inlets is threaded; and further comprising: first through fourth nitrous oxide line fittings, mounted, respectively, in said first through fourth nitrous oxide inlets; and first through fourth fuel fittings, mounted, respectively, in said first through fourth fuel inlets.

* * * * *